(12) United States Patent
Shiono et al.

(10) Patent No.: US 11,383,653 B2
(45) Date of Patent: Jul. 12, 2022

(54) MONITOR DISPOSITION STRUCTURE OF CAR

(71) Applicant: HONDA MOTOR CO., LTD., Tokyo (JP)

(72) Inventors: Masamitsu Shiono, Wako (JP); Yoshimasa Hayashida, Wako (JP); Daisuke Kato, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/771,780

(22) PCT Filed: Dec. 14, 2017

(86) PCT No.: PCT/JP2017/044974
§ 371 (c)(1),
(2) Date: Jun. 11, 2020

(87) PCT Pub. No.: WO2019/116519
PCT Pub. Date: Jun. 20, 2019

(65) Prior Publication Data
US 2021/0197730 A1 Jul. 1, 2021

(51) Int. Cl.
*B60R 11/02* (2006.01)
*B60K 35/00* (2006.01)
*B60R 11/04* (2006.01)
*B60R 11/00* (2006.01)

(52) U.S. Cl.
CPC .......... *B60R 11/0229* (2013.01); *B60K 35/00* (2013.01); *B60R 11/04* (2013.01); *B60K 2370/152* (2019.05); *B60K 2370/176* (2019.05); *B60R 2011/0021* (2013.01)

(58) Field of Classification Search
CPC ............................ B60R 11/0229; B60K 35/00
See application file for complete search history.

(56) References Cited

U.S. PATENT DOCUMENTS

| 10,940,798 | B2 * | 3/2021 | Mano ..................... H04N 7/181 |
| 11,027,664 | B2 * | 6/2021 | Shigefuji ............ B60R 11/0235 |
| 11,034,302 | B2 * | 6/2021 | Ozawa ................ B60R 11/0223 |
| 2005/0273219 | A1 * | 12/2005 | Kitao ...................... B60R 25/00 701/2 |
| 2010/0198463 | A1 * | 8/2010 | Plaster .................. B60R 25/102 701/45 |

(Continued)

FOREIGN PATENT DOCUMENTS

| JP | 07-108830 | 4/1995 |
| JP | 2009-006893 | 1/2009 |

(Continued)

OTHER PUBLICATIONS

International Search Report and Written Opinion for International Application No. PCT/JP2017/044974 dated Jan. 30, 2018, 8 pages.

*Primary Examiner* — Irfan Habib
(74) *Attorney, Agent, or Firm* — Amin, Turocy & Watson, LLP

(57) ABSTRACT

A monitor for displaying an image is disposed inside a front door of a car. The monitor is disposed at a position that does not overlap at least one of a front window and a front door window in a viewing direction of an occupant who sits in a front seat.

5 Claims, 3 Drawing Sheets

(56) References Cited

U.S. PATENT DOCUMENTS

| | | | | |
|---|---|---|---|---|
| 2012/0314075 A1* | 12/2012 | Cho | ............... | B60R 1/00 |
| | | | | 348/148 |
| 2013/0002877 A1* | 1/2013 | Miyoshi | ............... | B60R 1/00 |
| | | | | 348/148 |
| 2015/0360565 A1* | 12/2015 | Goto | ............... | B60R 1/00 |
| | | | | 701/36 |
| 2017/0344826 A1* | 11/2017 | Kanematsu | ............... | B60R 25/10 |
| 2020/0039440 A1* | 2/2020 | Ozawa | ............... | B60R 1/00 |

FOREIGN PATENT DOCUMENTS

| | | |
|---|---|---|
| JP | 2010-116125 | 5/2010 |
| JP | 2012-046054 | 3/2012 |
| JP | 2013-520363 | 6/2013 |
| JP | 2013-154671 | 8/2013 |
| JP | 2017-210063 | 11/2017 |

* cited by examiner

MONITOR DISPOSITION STRUCTURE OF CAR

TECHNICAL FIELD

The present invention relates to a monitor disposition structure of a car.

BACKGROUND ART

An integrated monitor unit in which a camera, which captures images outside a car, and a monitor, which displays the images captured by the camera, are integrated, and that is mounted on a triangular window portion in the front of a front door is known. In the case of a disposition structure of the monitor unit, the camera is disposed toward the outside of the car, and the monitor is disposed toward a driver who sits in a seat in the car interior.

However, in the disposition structure of the monitor unit, the monitor that displays an image blocks the triangular window in the front of the front door, and thus a part of the monitor overlaps a lateral rear position of a front window (a windshield glass). For this reason, in a case where the above disposition structure is adopted, an external viewing region seen through a window of an occupant who sits on a front seat is narrowed by the monitor.

CITATION LIST

Patent Literature

Patent Document 1

Published Japanese Translation No. 2013-520363 of the PCT International Publication

SUMMARY OF INVENTION

Technical Problem

The problem to be solved is to provide a monitor disposition structure of a car in which a monitor can be suitably disposed inside a front door without narrowing an external viewing region of an occupant who sits in a front seat.

Solution to Problem

The present invention is characterized by a monitor disposition structure of a car in which a monitor for displaying an image is disposed inside a front door of the car, and the monitor is disposed at a position that does not overlap at least one of a front window and a front door window in a viewing direction of an occupant who sits in a front seat.

With the above constitution, the monitor disposed on the front door does not narrow at least one of an external viewing region seen through the front window and external viewing region seen through the front door window. For this reason, in a case where the disposition structure is adopted, a wide external viewing region of the occupant who sits in the front seat can be secured.

The monitor is preferably disposed at a position that does not overlap either of the front window and the front door window in the viewing direction of the occupant who sits in the front seat.

In this case, the monitor narrows neither the external viewing region seen through the front window nor the external viewing region seen through the front door window. For this reason, in the case where the disposition structure is adopted, a wider external viewing region of the occupant can be secured.

The monitor may be disposed to extend from the front door toward an inside of a car interior.

In this case, since the monitor is disposed closer to the occupant who sits in the front seat, visibility of the monitor by the occupant who sits in the front seat is improved.

The monitor may be disposed such that the viewing direction of a driver who sits in the front seat and a screen are at nearly a right angle.

In this case, since the screen of the monitor is made to face a line-of-sight direction of the driver, the visibility of the monitor by the driver is improved.

The monitor may be disposed to be located above an upper portion shelf surface of an instrument panel in front of the front seat in a state in which the front door is closed.

In this case, operability of switches disposed on the surface of the instrument panel which are located on a side opposite to the occupant is not hindered by the monitor. Further, visibility of the instruments disposed on the surface of the instrument panel which are located on the side opposite to the occupant is not hindered by the monitor.

The monitor may be disposed to be located in front of a rear end face of an instrument panel in front of the front seat in a state in which the front door is closed.

In this case, since a moderate separation distance between the occupant who sits in the front seat and the monitor is secured, erroneous touching of the monitor by the occupant who sits in the front seat can be avoided.

The monitor may be disposed below a triangular window in the front of the front door.

In this case, the monitor does not obstruct an external view of the occupant through the triangular window, and is disposed close to the lower side of the triangular window. For this reason, a movement amount of the line of sight when the driver directly views the outside through the triangular window and when the driver views the image of the monitor can be reduced.

Advantageous Effects of Invention

In the monitor disposition structure of a car of the present invention, a monitor for displaying an image is disposed at a position that does not overlap at least one of a front window and a front door window in a viewing direction of an occupant who sits in a front seat. For this reason, in a case where the monitor disposition structure of a car of the present invention is adopted, the monitor can be suitably disposed inside the front door without narrowing an external viewing region of the occupant who sits in the front seat.

DESCRIPTION OF EMBODIMENTS

Hereinafter, an embodiment of the present invention will be described with reference to the drawings. In the following description, unless otherwise mentioned, front, rear, up, down, left, and right shall refer to front, rear, up, down, left, and right in a car.

Figure 1:
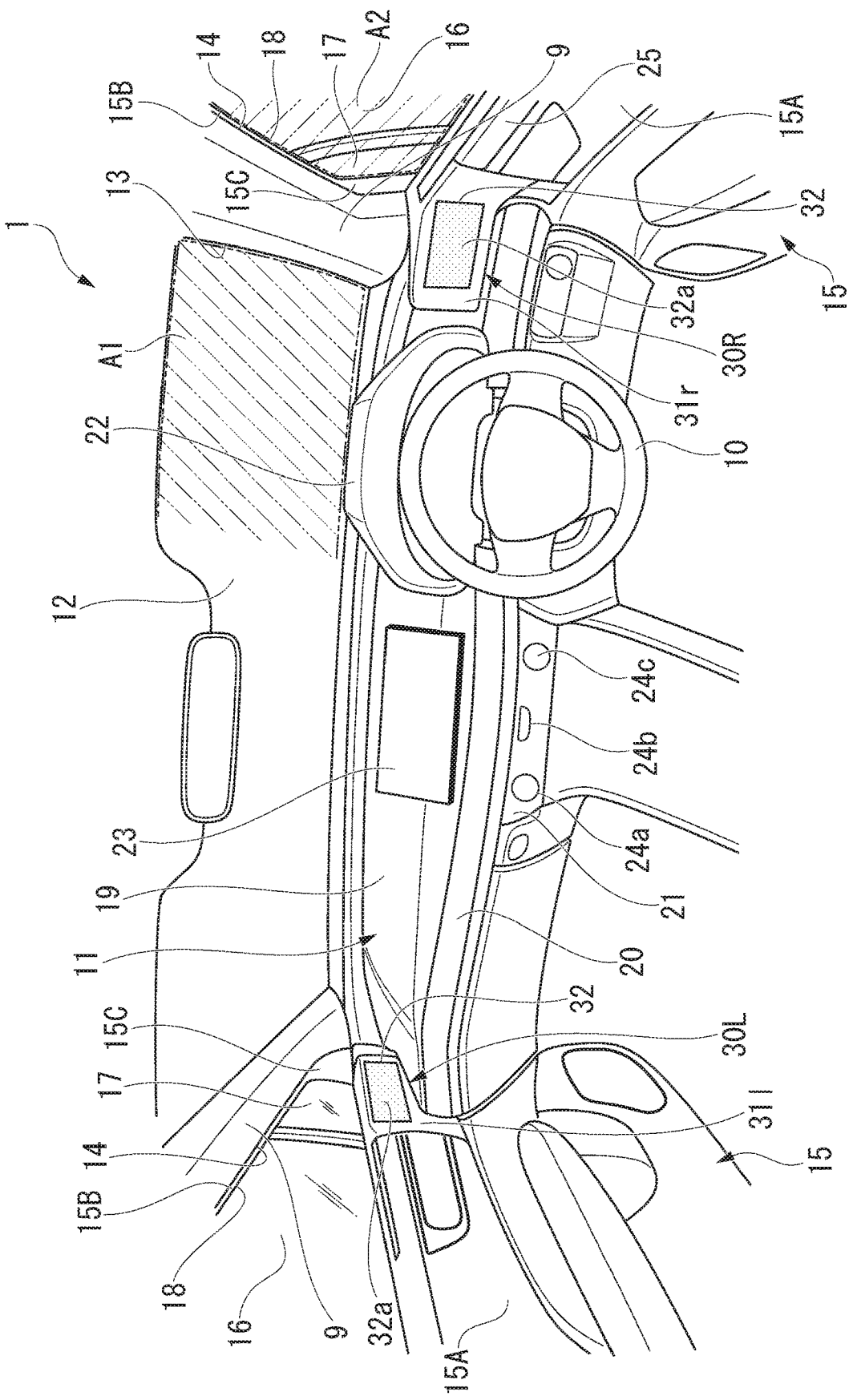
FIG. 1 is a perspective view showing disposition of monitors in a car interior of an embodiment.

FIG. 1 is a view showing the inside of a car interior of a car 1 of an embodiment. FIG. 1 is a diagonal top view showing a forward view from in front of front seats (a driver's seat and a front passenger seat) of the car 1.

In the car 1 of the present embodiment, a steering wheel 10 is disposed on the right side of the car. A seat (not shown) for the driver's seat is disposed on the right side of the car, and a seat (not shown) for the front passenger seat is disposed on the left side. An instrument panel 11 is disposed in front of the front seats. A windshield glass 12 is disposed on a front side of the instrument panel 11 in the car interior such that a rear portion thereof rises obliquely upward.

The windshield glass 12 is mounted on a front window 13 in the front of the car interior. The front window 13 is formed by being surrounded by, for instance, an upper end of a cowl top (not shown), left and right front pillars 9, and a front end of a roof.

The left and right front pillars 9 form front regions of door openings 14 of car body side portions. The left and right door openings 14 can be opened and closed by left and right corresponding front doors 15. In the front doors 15, a door sash 15B is coupled to an upper portion of a door main body 15A, and a door glass 16 is liftably held inside the door sash 15B. Further, a triangular window 15C, an upper side of which is obliquely inclined downward toward a front side, is provided on a front end side of the upper portion of the door main body 15A. A fixing glass 17 is mounted on the triangular window 15C.

In the case of the present embodiment, a frame-like portion surrounded by an upper side of the door main body 15A and the door sash 15B, and the triangular window 15C constitute a front door window 18.

The instrument panel 11 has an upper portion shelf surface 19 that obliquely extends nearly horizontally or slightly downward from the vicinity of a lower end of the windshield glass 12 to a rear side of the car, a vertical surface (a rear end face) 20 that is bent vertically downward from a rear end of the upper portion shelf surface 19, and a downward extension surface 21 that obliquely extends from a lower end of the vertical surface 20 to a front side of the car. Further, a driving information display 22 is provided to protrude upward in a region of the instrument panel 11 which is a front region of the upper half part of the steering wheel 10. Instruments such as a speedometer and a water temperature gauge, and various indicators are disposed together on the driving information display 22. Furthermore, various switches 24a to 24c of, for instance, a car navigation device 23 and an air conditioner are disposed on the vertical surface 20 and the downward extension surface 21 of the instrument panel 11.

Further, image pickup devices (not shown) for capturing rearward images from sides of the car are installed on a car outer side surface of each of the left and right front doors 15. An image pickup device is installed on the right front door 15 to be able to capture a rearward image from the right of the car, and an image pickup device is installed on the left front door 15 to be able to capture a rearward image from the left of the car. Images captured by the left and right image pickup devices are displayed on monitors 30L and 30R installed in the car room.

Positions at which the image pickup devices are installed are not limited to the front doors 15, and they can be installed on another panel or bumper outside the car.

The monitor 30R, which displays the rearward image from the right of the car, is installed inside the right front door 15 in the car interior. The monitor 30R includes a display panel 32 having a laterally long rectangular shape, and a housing 31r that holds the display panel 32. A right end of the housing 31r is integrally mounted on a front end of an interior member 25 of the right front door 15, and in this state, the housing 31r extends from the front end of the interior member 25 toward the inside of the car interior. A mounting surface of the display panel 32 of the housing 31r is obliquely formed to face an oblique rear side of the inside of the car interior. The monitor 30R is disposed such that a screen 32a of the display panel 32 is nearly orthogonal to a viewing direction of a driver who sits in a seat.

The left and right front doors 15 and the door openings 14 adjacent to the car body are formed such that upper portions adjacent to front ends of the door main bodies 15A are located in front of the vertical surface 20 of the instrument panel 11 in a state in which the front doors 15 are closed.

The monitor 30R is disposed such that the display panel 32 (the screen 32a) is located above the upper portion shelf surface 19 of the instrument panel 11 and in front of the vertical surface 20 (the rear end face) of the instrument panel 11 in a state in which the front doors 15 are closed. Further, the monitor 30R mounted on the interior member 25 of the right front door 15 is disposed close to a lower side of the triangular window 15C of the right front door 15.

The monitor 30L, which displays the rearward image from the left of the car, is installed inside the left front door 15 in the car interior. Like the right monitor 30R, the monitor 30L includes a display panel 32 and a housing 31l. The housing 31l is integrally mounted on a front end of an interior member 25 of the left front door 15. A mounting surface of the display panel 32 of the housing 31l is formed such that a front end side thereof is slightly inclined toward the inside of the car interior. The monitor 30L is disposed such that a screen 32a of the display panel 32 is nearly orthogonal to the viewing direction of the driver who sits in a seat.

The monitor 30L is disposed such that the display panel 32 is located above the upper portion shelf surface 19 of the instrument panel 11 and in front of the vertical surface 20 (the rear end face) of the instrument panel 11 in a state in which the left front door 15 is closed. Further, the monitor 30L mounted on the left front door 15 is disposed to be close to a lower side of the triangular window 15C of the left front door 15.

The left and right monitors 30L and 30R are disposed at positions that do not overlap the front window 13 and the left and right front door windows 18 in viewing directions of the occupants who sit in the driver's seat and the front passenger seat. In the case of the present embodiment, lower ends of the left and right front door windows 18 have nearly the same heights as a lower end of the front window 13, or slightly lower heights than the lower end of the front window 13. The left and right monitors 30L and 30R disposed below the triangular windows 15C of the left and right front doors 15 do not overlap the front window 13 and the left and right front door windows 18 in the viewing directions of the occupants who sit in the driver's seat and the front passenger seat.

In FIG. 1, A1 indicates an external viewing region seen through the front window 13 by a driver, and A2 indicates an external viewing region seen through the right front door window 18 by a driver. As shown in the same drawing, the monitor 30R does not overlap the external viewing regions A1 and A2.

Figure 2:
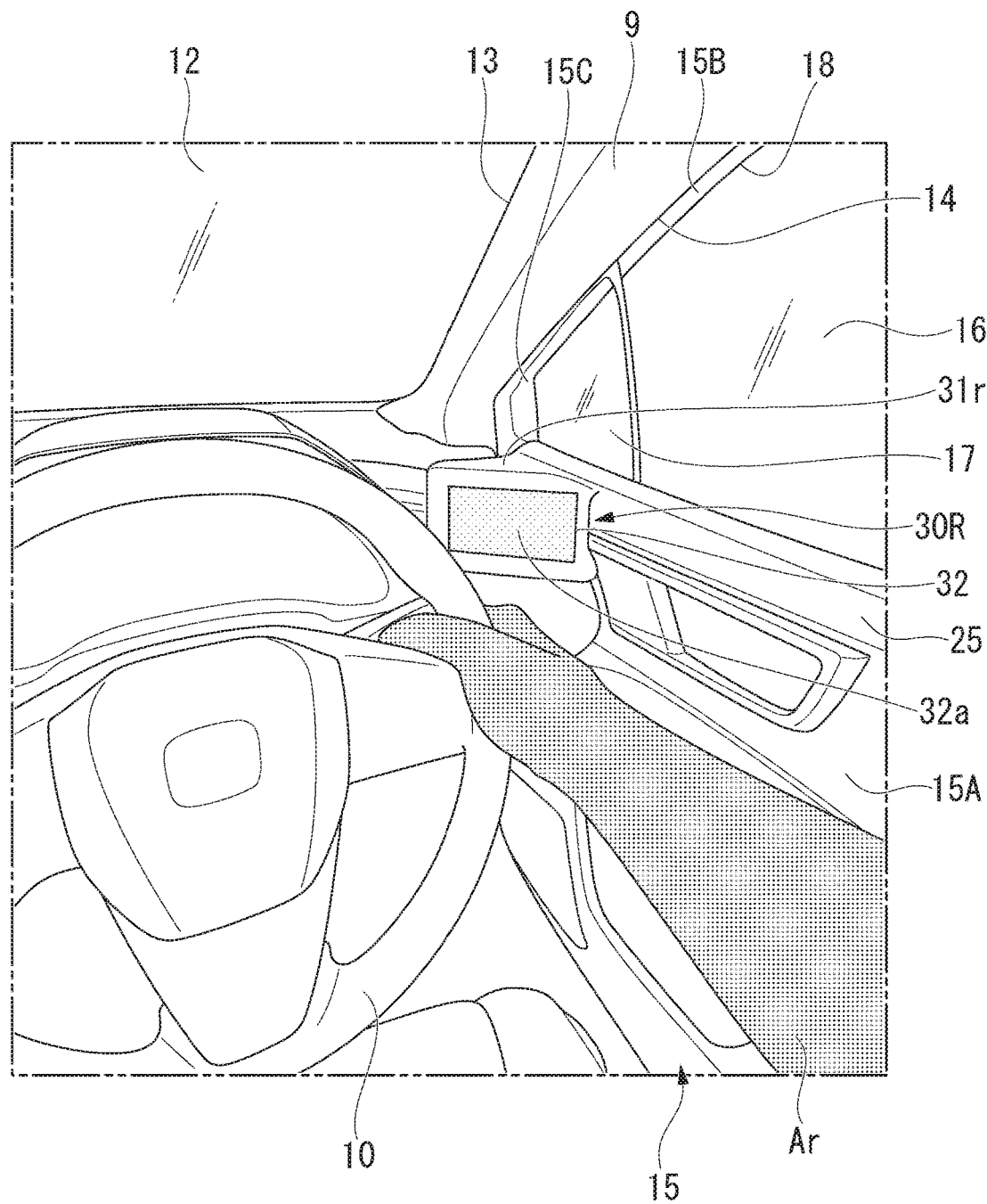
FIG. 2 is a perspective view showing the disposition of a monitor in the car interior of the embodiment and an operation state of a steering wheel by a driver.
Figure 3:
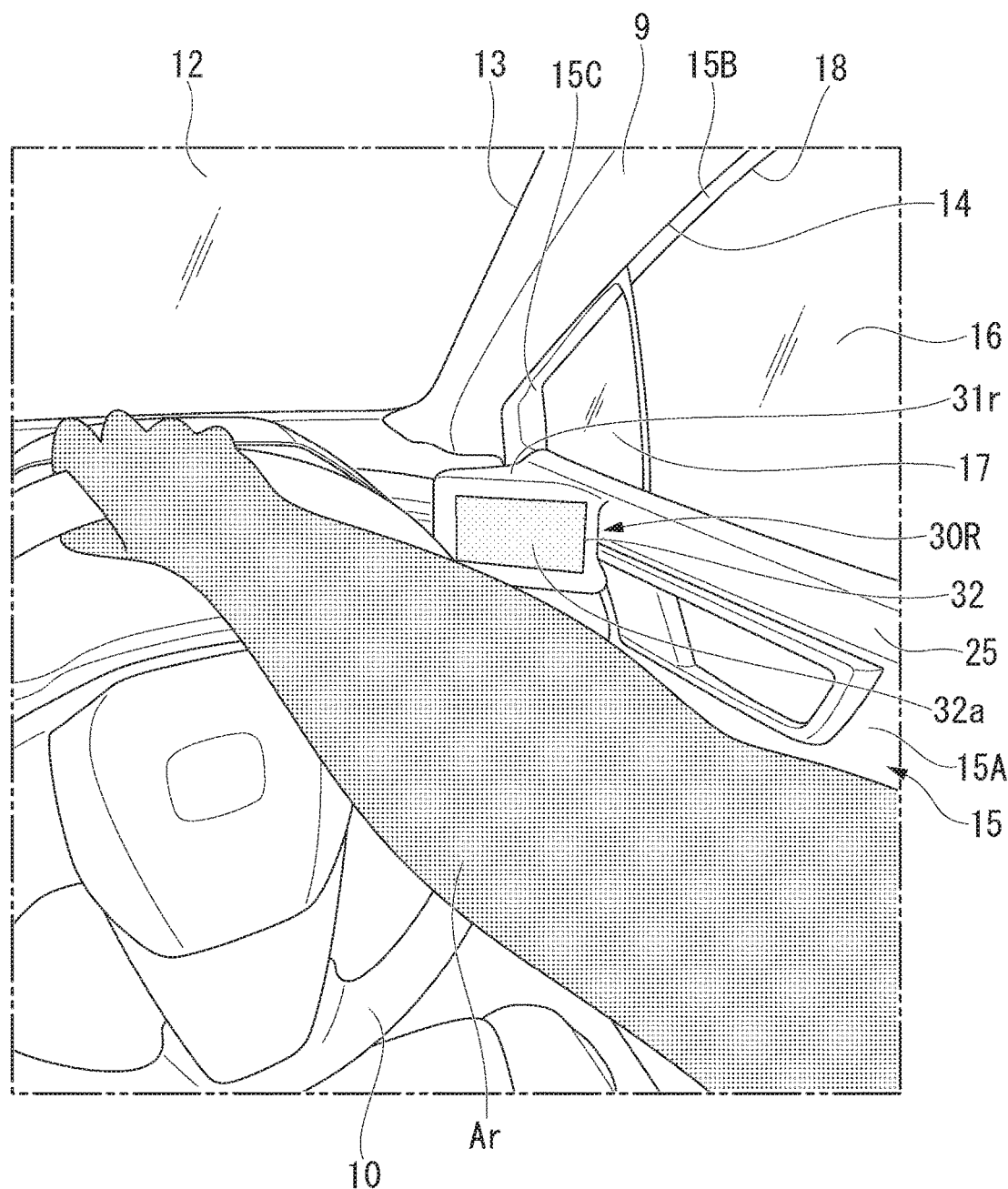
FIG. 3 is a perspective view showing the disposition of the monitor in the car interior of the embodiment and an operation state of the steering wheel by the driver.

FIGS. 2 and 3 are views showing a dispositional relationship between the right monitor 30R and an arm Ar of the driver when the driver operates the steering wheel 10.

As shown in the same drawings, in the monitor disposition structure of the present embodiment, the monitor 30R is installed at a front upper end of the interior member 25 of the right front door 15 to extend in a car width direction. For this reason, in comparison with a case where the monitor 30R is installed on the instrument panel 11, the monitor 30R is disposed at a position away from the outside of the steering wheel 10. Therefore, as shown in FIGS. 2 and 3, when a driver operates the steering wheel 10, the screen 32a of the monitor 30R is hardly hidden by the steering wheel 10 or the arm Ar of the driver. For this reason, visibility of the monitor 30R is well maintained during car driving.

As described above, in the monitor disposition structure of the present embodiment, the left and right monitors 30L and 30R, each of which displays an image, are disposed at positions that overlap neither the front window 13 nor the front door windows 18 in the viewing directions of the occupants who sit in the front seats. Therefore, in a case where the monitor disposition structure of the present embodiment is adopted, the monitors 30L and 30R can be favorably disposed inside the front doors 15 while wide external viewing regions seen through the front window 13 and the front door windows 18 by the occupants who sit in the front seats are secured.

Further, in the monitor disposition structure of the present embodiment, the monitor 30R is disposed to extend from the front door 15 toward the inside of the car interior. For this reason, the monitor 30R is disposed closer to the occupant who sits in the front seat. Therefore, in the case where the monitor disposition structure of the present embodiment is adopted, the visibility of the monitor 30R by the occupant is improved.

Furthermore, in the monitor disposition structure of the present embodiment, the left and right monitors 30L and 30R are disposed such that the viewing direction of the driver who sits in the front seat and the screen 32a are nearly at a right angle. Therefore, in the case where the monitor disposition structure of the present embodiment is adopted, the screens 32a of the monitors 30L and 30R are made to face a line-of-sight direction of the driver, and the visibility of the monitor 30L and the visibility of the monitor 30R by the occupant are improved.

Further, in the monitor disposition structure of the present embodiment, the monitors 30L and 30R are disposed to be located above the upper portion shelf surface 19 of the instrument panel 11 in the state in which the front doors 15 are closed. For this reason, operability of the switches disposed on the vertical surface 20 and the downward extension surface 21 of the instrument panel 11 is not hindered by the monitors 30L and 30R. Further, visibility of the instruments disposed on the vertical surface 20 and the downward extension surface 21 is not hindered by the monitors 30L and 30R.

Further, in the monitor disposition structure of the present embodiment, the monitors 30L and 30R are disposed in front of the vertical surface 20 (the rear end face) of the instrument panel 11 in the state in which the front doors 15 are closed. For this reason, moderate separation distances between the occupant who sits in the front seat and the monitors 30L and 30R can be secured. Therefore, in the case where the monitor disposition structure of the present embodiment is adopted, for instance, when the occupant who sits in the front seat moves his/her arm, unexpected contact between the arm and the monitors 30L and 30R can be avoided.

Furthermore, in the case of the monitor disposition structure of the present embodiment, the monitors 30L and 30R are disposed close to the lower portions of the triangular windows 15C in the front of the left and right front doors 15. For this reason, the monitors 30L and 30R installed on the front doors 15 do not obstruct the external view of the driver seen through the triangular windows 15C. Therefore, in the case where the monitor disposition structure of the present embodiment is adopted, a movement amount of the line of sight when the driver directly views the outside through the triangular windows 15C and when the driver views the images of the monitors 30L and 30R can be reduced.

The present invention is not limited to the above embodiment, and various changes in design are possible without departing from the spirit and idea of the present invention. For example, in the above embodiment, the monitors 30L and 30R are disposed at the positions that overlap neither the front window 13 nor the front door windows 18 in the viewing directions of the occupants who sit in the front seats. However, the monitors 30L and 30R may be disposed at positions that do not overlap at least one of the front window 13 and the front door windows 18 in the viewing directions of the occupants who sit in the front seats.

REFERENCE SIGNS LIST

1 Car
11 Instrument panel
13 Front window
15 Front door
15C Triangular window
18 Front door window
19 Upper portion shelf surface
20 Vertical surface (rear end face)
30L, 30R Monitor
32a Screen

What is claimed is:

1. A monitor disposition structure of a car in which a monitor for displaying an image is disposed inside a front door of the car,
    wherein the monitor is disposed at a position that does not overlap either of a front window and a front door window in a viewing direction of an occupant who sits in a front seat,
    an upper portion of a front end of a door main body of the front door is located in front, in a travelling direction of the car, of a rear end face of an instrument panel, and
    the monitor extends from the upper portion of the front end of the door main body toward an inside of a car interior, and is disposed to be located above an upper portion shelf surface of the instrument panel in front of the front seat and in front of the rear end face of the instrument panel in front of the front seat in a state in which the front door is closed.

2. The monitor disposition structure according to claim 1, wherein the monitor is disposed such that the viewing direction of a driver who sits in the front seat and a screen are at nearly a right angle.

3. The monitor disposition structure according to claim 1, wherein the monitor is disposed below a triangular window in the front of the front door.

4. The monitor disposition structure according to claim 1, wherein the monitor has a first monitor disposed obliquely against the right front door and a second monitor disposed obliquely with a different angle from that of the first monitor against the left front door.

5. The monitor disposition structure according to claim 3, wherein a lower end of the triangular window has the same height as or a lower height than a lower end of the front window.

* * * * *